(No Model.)

J. L. SIMMONS.
EXPLORER'S INSTRUMENT.

No. 441,777. Patented Dec. 2, 1890.

ATTEST.
J. Henry Kaiser
Austin Terryberry

INVENTOR.
John L. Simmons
by C. M. Simpson
attorney

THE NORRIS PETERS CO., PHOTO-LITHO., WASHINGTON, D. C.

UNITED STATES PATENT OFFICE.

JOHN L. SIMMONS, OF DULUTH, MINNESOTA.

EXPLORER'S INSTRUMENT.

SPECIFICATION forming part of Letters Patent No. 441,777, dated December 2, 1890.

Application filed May 7, 1890. Serial No. 350,493. (No model.)

*To all whom it may concern:*

Be it known that I, JOHN L. SIMMONS, a citizen of the United States, residing at Duluth, in the county of St. Louis and State of Minnesota, have invented certain new and useful Improvements in an Explorer's Instrument; and I do hereby declare the following to be a full, clear, and exact description of the invention, such as will enable others skilled in the art to which it appertains to make and use the same.

My invention relates to an explorer's instrument adapted to be used by explorers and woodsmen in exploring, locating, and estimating timber and wooded lands.

The object of my invention is to insure greater accuracy in the woodsman's or explorer's work and to facilitate and expedite their labors while exploring or estimating timber-lands. I attain these objects by the instrument illustrated in the accompanying drawings, in which similar letters of reference indicate like parts.

Figure 1:
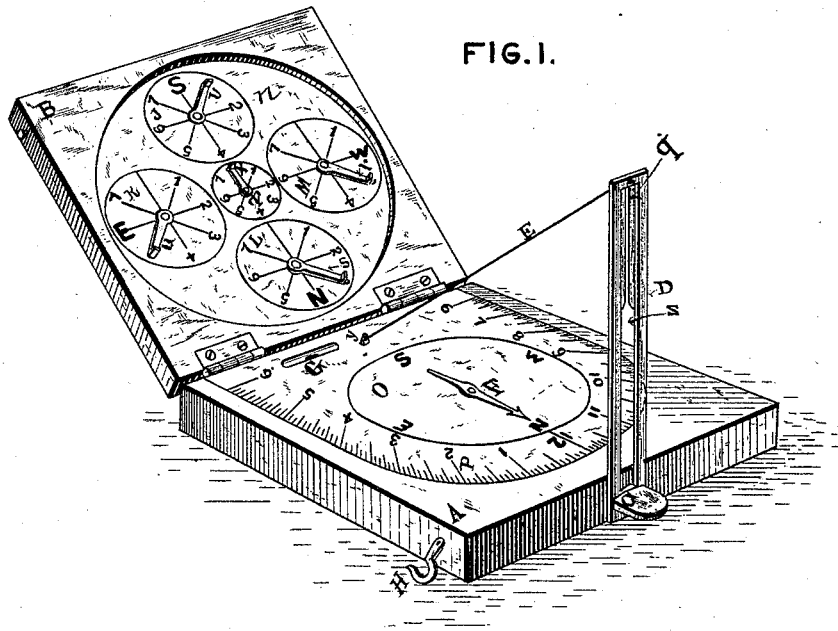
Figure 2:
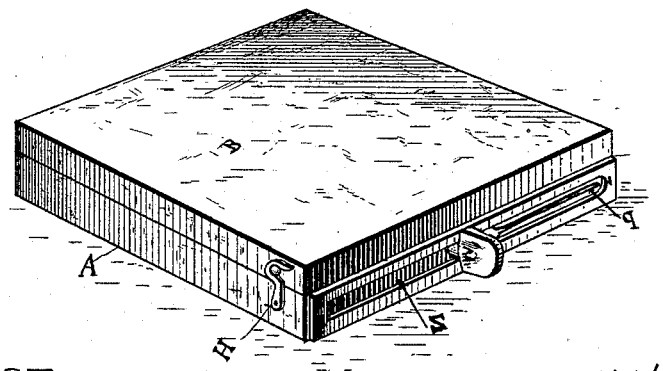

Figure 1 is a perspective view of the open instrument with gnomon set and ready for use. Fig. 2 is a perspective view of the instrument closed and ready for the pocket.

The body or base of the instrument A and the hinged top or lid B constitute the casing of the instrument. The adjustable sight-standard D has a slidable pivoted connection at the outer edge of the base by C, a thumb-screw, the center of the pivotal connection being in the north and south line of the instrument. I make a long open slot in the lower portion of the sight-standard D, thus giving the standard a slidable connection at pivot C and enabling the standard to be folded laterally, as shown in Fig. 2. In the center of the upper portion of the standard D there is a long thin-edged hair-like sight-slot Q, parallel to the sides of the standard. In the upper end of the standard D and in line with the sight-slot is an incision for attaching one end of the elastic gnomon E, which may be made of rubber, the other end of this gnomon being attached at $y$, opposite the south point of compass O. I intend this elastic gnomon to answer a triple purpose: first, for accurately adjusting standard D in a vertical position, point of attachment $y$ being slightly above the axis of pivot C, a vertical position for the standard can be easily obtained by sighting through slot Q upon the gnomon; second, for distance and range sighting purposes when used in connection with slot Q, and third, for sun-dial purposes. The sun-dial is made up of standard D, for the purpose of adjusting the gnomon E; compass O, set in the face of the instrument; dial-face P, with the hours from six a. m. to six p. m. marked thereon about the face of the compass, and spirit-level G, which I set in the face of the instrument parallel to the east and west lines of the instrument. The primary object of this sun-dial is the correction of any variation or deviation of the compass, which may be caused by attraction of a local nature, usually mineral.

In Northern Michigan, Wisconsin, and Minnesota the mineral deposits often cause the compass to deviate as many as one hundred and eighty degrees. With the aid of a chronometer the explorer can easily ascertain any deviation of the compass of this instrument. When the gnomon E is made taut by adjusting standard D and its sun-shadow is set to compare in time with the chronometer, any deviation there may be then becomes apparent.

When the compass is working satisfactorily the standard D may be folded and retained upon the side of the instrument, as shown in Fig. 2.

Letter $n$ represents a cardinal-point indicator for any change of direction the woodsman may make while "looking" or exploring a section or quarter-section of land. This indicator consists of four independent dials J, K, L, and M, and a fifth one T set upon the inner surface of the upper portion of the casing.

$v$, $u$, $s$, $r$, and $x$ are the adjustable hands of the respective dials. The four outer dials are for the cardinal points, and so correspond when open and ready for use, as shown in Fig. 1—J for south, K for east, L for north, and M for west. Dial T is used for a mile or half-mile check, depending on the unit of distance used. The dials and hands are set below the inner surface of the upper portion of the casing. Each have eight points.

Explorers and woodsmen use forty rods, an ascertained number of paces, (one-eighth of a mile,) as a unit of distance, in order to keep their bearings and make their observations, which unit is known to and called by them a "tally." When a more thorough examination of the timber is desired, twenty rods, or a "half-tally," is used as the unit. An explorer in estimating the timber on a quarter-section usually runs on a half-tally as his unit. If, for example, he starts in at the south-east corner, runs along the south line one tally, (twenty rods,) thence north three tallies, (sixty rods,) thence west two tallies, thence south two tallies, west four tallies, north two tallies, east two tallies, north two tallies, west two tallies, north two tallies, east four tallies, south two tallies, east two tallies, and north three tallies, which brings him to the north line, where he proves up and completes his minutes. It will thus be seen that a very thorough "cross-section" of the land has been made and all timber been viewed within a range of twenty rods.

With my instrument I indicate each tally upon the dial of the same direction, and when any of the four cardinal-point dials have been set eight times that fact is recorded or checked on the inner dial T, and the hand of the dial or dials that have been around once are again set or moved forward, as in the beginning, until the point of proving up is reached at section or quarter-section line. The old method for the indication of these tallies was by means of small bits of wood carried in the hand, mouth, or pocket, or by breaking a stick or twig carried in the hand, many depending solely on the memory. These crude means for keeping the bearings have caused many vexatious and expensive inaccuracies and the loss of much valuable time in exploring and estimating timber and mineral lands.

By the aid of my instrument the explorer, land-looker, or woodsman will at the end of each tally, as well as at the point of proving up, have a complete record of his course before him and a very handy and simple means for the correction of any variations of the compass. Since the explorer must content himself with the least possible baggage, with my instrument he will be well equipped to do much more thorough and accurate work than ever before.

Having thus described my invention, what I claim, and wish to secure by Letters Patent, is—

1. An explorer's instrument consisting of a casing, a compass, and independent cardinal-point indicators, all arranged and operated substantially as herein set forth and shown.

2. An explorer's instrument consisting of a casing, compass, independent cardinal-point indicators, and a mile-check register, all substantially as hereinbefore set forth and shown.

3. An explorer's instrument consisting of a hinged casing, a compass in one part of said casing, and independent cardinal-point indicators on the other part of said casing, all arranged substantially as herein set forth and shown.

4. An explorer's instrument consisting of a hinged casing, a compass in one part of said casing, and independent cardinal-point indicators and a mile-check indicator on the other part of the said casing, all substantially as set forth.

5. An explorer's instrument consisting of a hinged casing, a compass in one part of said casing, a spirit-level, and an independent cardinal-point indicator and a mile-check indicator on the other part of said casing, all arranged substantially as set forth.

6. An explorer's instrument having a compass provided with a laterally-foldable sight-standard, arranged and operated substantially as herein set forth.

7. An explorer's instrument having a compass provided with a laterally-foldable sight-standard, the axis of the pivotal connection of the sight-standard being arranged parallel to the line of sight, all substantially arranged as herein set forth.

8. An explorer's instrument having a compass provided with an adjustable sight-standard with a broad slot in the lower part having a slidable connection with pivot C, all substantially as and for the purpose herein set forth.

9. An explorer's instrument having a compass provided with a pivoted laterally-foldable sight-standard, with a long thin-edged hair-like sight-slot in the upper part of said standard, all substantially as set forth.

10. An explorer's instrument having a compass with a laterally-adjustable sight-standard, said standard having a set-screw pivotal connection upon the side of the lower part of the casing and opposite the north point of the compass, all substantially as described and set forth.

11. An explorer's instrument having a compass with an adjustable slotted sight-standard and a pivotal set-screw connection upon the side of the instrument, as described, and for the purpose specified.

12. An explorer's instrument consisting of a compass, an adjustable sight-standard, a level, and pivotal set-screw, all as set forth and shown.

13. An explorer's instrument consisting of a compass, an adjustable slotted sight-standard, and a gnomon, all substantially as set forth.

14. An explorer's instrument having a compass, a laterally-adjustable sight-standard, and an elastic gnomon, all substantially as described.

15. An explorer's instrument consisting of a casing, a compass, independent cardinal-point indicators, a mile-check indicator, and a laterally-adjustable sight-standard, substantially as described and set forth.

16. An explorer's instrument consisting of a casing, a compass, independent cardinal-point indicators, a mile-check indicator, a laterally-adjustable sight-standard, and a gnomon, all substantially as set forth and described.

17. An explorer's instrument having a compass, an adjustable slotted sight-standard with pivotal connections to the side of the instrument, a level, and a sun-dial face about the compass-face, all as herein described and set forth.

18. An explorer's instrument consisting of a casing, a compass, a laterally-adjustable sight-standard, a gnomon, a level, a sun-dial face upon the lower part of the casing, and four independent cardinal-point indicators, together with a mile-check indicator, upon the upper part of said casing, all said parts being arranged and operated substantially as herein set forth.

19. A cardinal-point indicator consisting of four independent dials for each cardinal point, said dials to be divided into eight points each, and an independent mile-check indicator, substantially as described.

20. An explorer's instrument consisting of a compass, an adjustable foldable sight-standard, an elastic gnomon, the dial-face P, a level, and the cardinal-point indicators, all substantially as and for the purpose herein set forth.

21. An explorer's instrument consisting of a casing, a compass, deviation-corrector, and an independent cardinal-point indicator including a mile-check indicator, all substantially as described.

In testimony whereof I affix my signature in presence of two witnesses.

JOHN L. SIMMONS.

Witnesses:
C. M. SIMPSON,
Q. J. BUNTING.